(12) United States Patent
Lederer

(10) Patent No.: US 7,195,265 B2
(45) Date of Patent: Mar. 27, 2007

(54) FORK BRIDGE FOR A MOTORCYCLE SUSPENSION

(75) Inventor: Markus Lederer, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 31 days.

(21) Appl. No.: 10/992,016

(22) Filed: Nov. 19, 2004

(65) Prior Publication Data
US 2005/0140114 A1    Jun. 30, 2005

Related U.S. Application Data

(63) Continuation of application No. PCT/EP03/04300, filed on Apr. 25, 2003.

(30) Foreign Application Priority Data

May 31, 2002    (DE) ............................... 102 24 093

(51) Int. Cl.
B62K 21/02    (2006.01)
B62K 21/04    (2006.01)

(52) U.S. Cl. ........................ 280/279; 280/280

(58) Field of Classification Search ........ 280/279, 280/280
See application file for complete search history.

(56) References Cited

U.S. PATENT DOCUMENTS 4,697,665 A    10/1987 Eastman et al.
4,709,774 A *  12/1987 Saito et al. ............... 180/229
6,802,519 B2 * 10/2004 Morgan et al. ........... 280/272

FOREIGN PATENT DOCUMENTS

| | | |
|---|---|---|
| DE | 93 00 678.0 | 1/1993 |
| DE | 44 44 651 A1 | 12/1994 |
| DE | 197 12 326 A1 | 3/1997 |
| DE | 297 08 975 U1 | 5/1997 |
| DE | 197 37 050 C1 | 8/1997 |
| DE | 297 19 891 U1 | 11/1997 |
| EP | 0 994 014 A1 | 10/1998 |
| FR | 2 653 403 A1 | 4/1991 |
| FR | 2653403 A1 * | 4/1991 |

OTHER PUBLICATIONS

International Search Report, Apr. 25, 2003.

* cited by examiner

Primary Examiner—Lesley D. Morris
Assistant Examiner—Marc A Scharich
(74) Attorney, Agent, or Firm—Crowell & Moring LLP

(57) ABSTRACT

A motorcycle chassis component, such as a fork bridge of a front wheel fork, is provided with an integrated partial section of a fluid system circuit, such as a hydraulic brake circuit. By providing a partial section of the fluid system in the chassis component, the chassis component functions as a portion of the fluid system, thereby simplifying the fluid system, lowering manufacturing and component costs, and reducing fluid system vulnerability to damage from external impacts.

10 Claims, 1 Drawing Sheet

FORK BRIDGE FOR A MOTORCYCLE SUSPENSION

This application claims the priority of German application no. 10224093.0, filed May 31, 2002, and PCT International Patent Application No. PCT/EP03/04300, filed Apr. 25, 2003, the disclosure of which is expressly incorporated by reference herein.

BACKGROUND AND SUMMARY OF THE INVENTION

The present invention relates to a fork bridge for connecting two fork tubes of a motorcycle and a chassis component of a motorcycle containing a fluid channel.

Such a fork bridge is known from German Patent DE 44 44 651 A1. It has two cylindrical recesses to accommodate one fork tube each and a third recess in between, through which the fork bridge is connected to the motorcycle frame by a steering head bearing.

Modern motorcycles frequently have a right and a left brake on the front wheel. With previous designs, the brake pressure to the two brake calipers is applied via a distributor piece and lines or hoses to the two front wheel brakes. This distributor piece is usually mounted on the front wheel guide as a separate part in the area of the fork bridge and uniformly distributes the brake pressure, which is applied via the hand lever to both brake calipers.

The object of this invention is to create a chassis component, in particular a fork bridge, having an expanded functionality. This object is achieved by integrating a partial section of a hydraulic circuit of a motorcycle into a chassis component. The term "hydraulic circuit" may be understood to mean, for example, a hydraulic brake circuit, a hydraulic clutch circuit, a coolant circuit or a fuel circuit, etc. The chassis component may be, for example, a fork bridge of a front wheel fork. In more concrete terms, a fluid passage is provided in the chassis component and/or in the fork bridge and functions a brake line section or as a clutch line section, for example.

When a fork bridge is mentioned below, all explanations refer in general to chassis components such as the frame, etc. When the brake line is mentioned, this is to be understood only as an example and also applies to other fluid systems, e.g., hydraulic clutch lines.

According to one refinement of this invention, the distributor part may be omitted completely by providing a fluid channel in the fork bridge, branching into branch channels, preferably in the case of a brake fluid system, into two branch channels. The fluid channel is connected to the hand brake lever by a fluid connection and a brake line. Fluid connections are also provided on the ends of the branch channels and are connected to the right and/or left front wheel brakes. The channels that are integrated into the fork bridge of the front wheel guide also function as brake line branches.

The fluid channel and the two branch channels are preferably arranged in the form of a Y. The fluid connection of the fluid channel may be arranged in the central area on the driver's side, i.e., in the rear area of the fork bridge, and the fluid connections of the branch channels may be arranged in a right and/or left front area (with respect to the driver) of the fork bridge. However, this arrangement is not obligatory. The fluid channels may also be arranged differently.

According to a refinement of this invention, the fluid connections each have a threaded bore, permitting a connection to appropriate connecting elements of the brake lines. The fluid channels may be formed by bores produced subsequently. The bores may preferably be provided in the unmachined part of the fork bridge. Furthermore, stops for serial assembly of the brake lines or hoses may be provided at the screw connections of the fluid connections.

Other objects, advantages and novel features of the present invention will become apparent from the following detailed description of the invention when considered in conjunction with the accompanying drawings.

DETAILED DESCRIPTION

Figure 1:
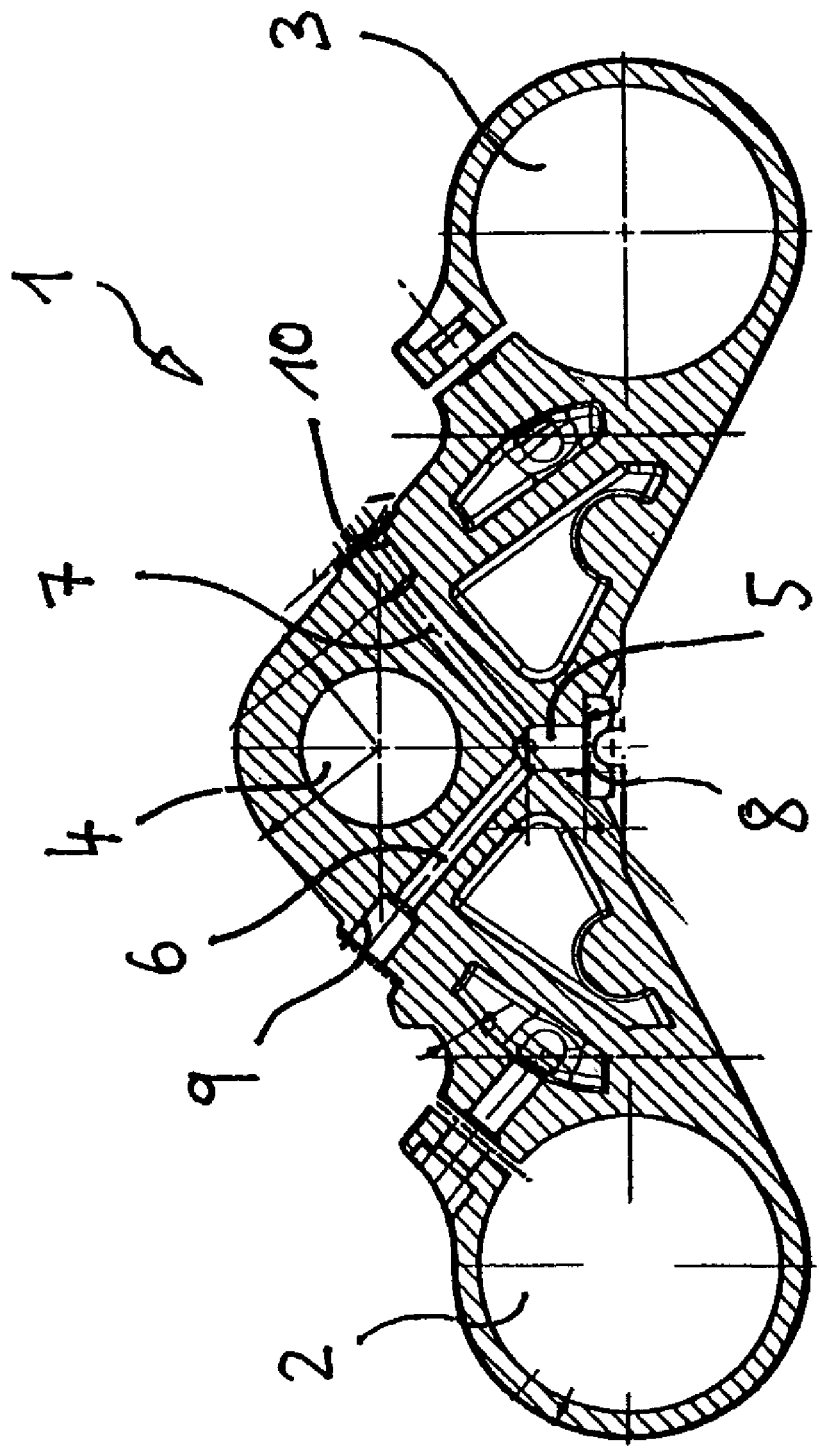
FIG. 1 is a cross-section view of a chassis component in accordance with an embodiment of the present invention.

FIG. 1 shows a fork bridge 1 having a first and a second recess 2, 3 to accommodate fork tubes (not shown), with a third recess 4 between them for connecting the fork bridge 1 to the motorcycle frame, for example, via a steering head bearing (not shown) or via a ball joint (not shown), as in the BMW motorcycle "Telelever" front suspension system.

A first fluid channel 5 which branches in a Y pattern into two branch channels 6, 7, represented here with only dotted lines, is provided in the fork bridge 1. In the middle area of the fork bridge 1 which is at the rear facing the driver, a first fluid connection 8 is provided on the first fluid channel 5. Accordingly, a fluid connection 9, 10 is provided on the right and left of the recess 4 in the front area of the fork bridge 1, one each at the openings of the two channels 6, 7. The fluid connection 8 is connected by a brake line (not shown) to the hand brake lever (not shown). Brake lines (not shown) lead downward from the fluid connections 9, 10 to the right and left front wheel brakes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fork bridge for connecting two fork tubes of a motorcycle, wherein the fork bridge has a fluid channel therein configured to conduct a fluid between a first fluid connection end and a second fluid connection end.

2. The fork bridge as claimed in claim 1, wherein the fluid channel passes through the fork bridge.

3. The fork bridge as claimed in claim 1, wherein the fluid channel branches off into at least two branch channels downstream from the first fluid connection end, the second fluid connection end being provided at the end of one branch channel and a third fluid connection end being provided at the end of another branch channel.

4. The fork bridge as claimed in claim 3, wherein there are two branch channels, and the fluid channel and the branch channels are arranged in relation to one another in the form of a Y.

5. The fork bridge as claimed in claim 4, wherein the first fluid connection end of the fluid channel upstream of the branch channels is arranged in a middle area on one side of the fork bridge, and the second and third fluid connection ends of the branch channels are arranged in a right and left area of the fork bridge, respectively at an opposite side of the fork bridge.

6. The fork bridge as claimed in claim 1, wherein the fluid connection ends each have a threaded bore.

7. The fork bridge as claimed in claim 3, wherein at least one of the fluid channel and the branch channels is a borehole.

8. The fork bridge as claimed in claim 3, wherein at least one of the fluid channel and the branch channels is connected to a brake line of the motorcycle via the fluid connections ends.

9. A chassis component of a motorcycle, wherein the chassis component has at least one fluid channel therein configured to conduct a fluid between a first fluid connection end and a second fluid connection end, and at least one of the at least one fluid channels is a partial section of a brake circuit of the motorcycle.

10. A chassis component of a motorcycle, wherein the chassis component has at least one fluid channel therein configured to conduct a fluid between a first fluid connection end and a second fluid connection end, and at least one of the at least one fluid channels is a partial section of a hydraulic clutch circuit of the motorcycle.

* * * * *